United States Patent
Suryanarayana et al.

(10) Patent No.: US 11,592,998 B2
(45) Date of Patent: Feb. 28, 2023

(54) SYSTEM AND METHOD FOR SECURE ACCESS TO A DISTRIBUTED VIRTUAL FIRMWARE NETWORK DRIVE

(71) Applicant: DELL PRODUCTS, LP, Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

(*) Notice: Subject to any disclaimer, the term of this patent is extended or adjusted under 35 U.S.C. 154(b) by 273 days.

(21) Appl. No.: 16/814,128

(22) Filed: Mar. 10, 2020

(65) Prior Publication Data
US 2021/0286530 A1    Sep. 16, 2021

(51) Int. Cl.
*G06F 3/06* (2006.01)
*G06F 21/64* (2013.01)
*G06F 9/4401* (2018.01)
*G06F 11/14* (2006.01)
*G06F 1/3203* (2019.01)

(52) U.S. Cl.
CPC .......... *G06F 3/0622* (2013.01); *G06F 1/3203* (2013.01); *G06F 3/0637* (2013.01); *G06F 3/0664* (2013.01); *G06F 9/4401* (2013.01); *G06F 11/1415* (2013.01); *G06F 21/64* (2013.01)

(58) Field of Classification Search
CPC ...... G06F 3/0637; G06F 3/0622; G06F 21/64; G06F 9/4401; G06F 1/3203; G06F 11/1415; H04L 63/08; H04L 63/20
See application file for complete search history.

(56) References Cited

U.S. PATENT DOCUMENTS

| | | | |
|---|---|---|---|
| 9,495,535 B2 | 11/2016 | Suryanarayana et al. | |
| 9,612,846 B2 | 4/2017 | Puthillathe et al. | |
| 10,061,596 B2 | 8/2018 | Dasar et al. | |
| 2017/0171246 A1* | 6/2017 | Arumugam | H04L 63/08 |
| 2017/0293520 A1 | 10/2017 | Onniyil et al. | |

* cited by examiner

*Primary Examiner* — Ernest Unelus
(74) *Attorney, Agent, or Firm* — Larson Newman, LLP (57) ABSTRACT

An information handling system includes a virtual network access module configured to access a virtual network drive that has a first partition in a local storage resource and a second partition in a remote storage resource. In response to detection of an exception, a processor may trigger an exception handler that directs a service processor to initialize a network stack. The processor initializes a mailbox to transmit a mailbox request to retrieve network configuration settings to be used in the initialization of the network stack. The service processor transmits a request to the processor to initialize the mailbox, and initializes the network stack based on the network configuration settings. Subsequent to the initialization of the network stack, a universal network device interface request may be sent to mount and secure communication with the virtual network drive.

17 Claims, 6 Drawing Sheets

SYSTEM AND METHOD FOR SECURE ACCESS TO A DISTRIBUTED VIRTUAL FIRMWARE NETWORK DRIVE

FIELD OF THE DISCLOSURE

The present disclosure generally relates to information handling systems, and more particularly relates to secure access to a distributed virtual firmware network drive.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a virtual network access module configured to access a virtual network drive that has a first partition in a local storage resource and a second partition in a remote storage resource. In response to detection of an exception, a processor may trigger an exception handler that directs a service processor to initialize a network stack. The processor initializes a mailbox to transmit a mailbox request to retrieve network configuration settings to be used in the initialization of the network stack. The service processor transmits a request to the processor to initialize the mailbox, and initializes the network stack based on the network configuration settings. Subsequent to the initialization of the network stack, a universal network device interface request may be sent to mount and secure communication with the virtual network drive.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
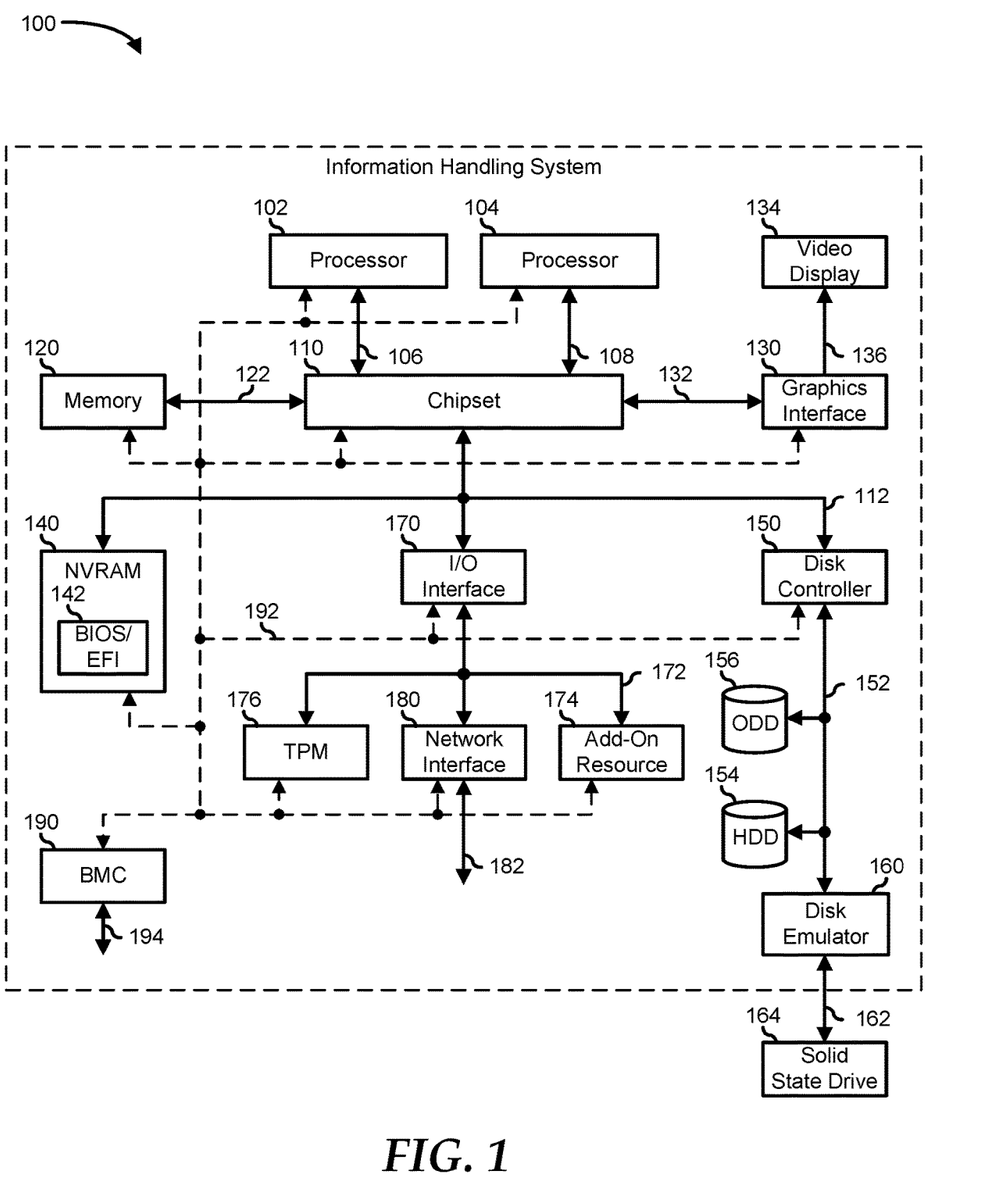
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/unified extensible firmware interface (BIOS/UEFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NV-RAM 140 includes BIOS/UEFI module 142 that stores machine-executable code (BIOS/UEFI code) that operates to detect the resources of information handling system 100, to provide drivers for the resources, to initialize the resources, and to provide common access mechanisms for the resources. The functions and features of BIOS/UEFI module 142 will be further described below.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 also referred to as a service processor is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and ECs included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/UEFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Although information handling system 100 as shown in this disclosure include a BMC 190, one of skill in the art will appreciate an EC may perform similar functions as BMC 190 and may be used in the consumer-level devices also referred to as client type platforms instead of BMC 190. Thus, information handling system 100 may have an EC instead of BMC 190 be deemed to have an EC instead of BMC 190 if information handling system 100 is a client type platform.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In many information handling systems, the BIOS/UEFI is capable of operating in pre-boot mode in which the BIOS/UEFI executes certain instructions prior to loading and execution of an operating system. When the information handling system is booted, the BIOS/UEFI may load files stored in an extensible firmware interface (EFI) system partition of a local storage resource to start the operating system and various utilities. Because the EFI system partition may also include a recovery image for the information handling system, during a boot failure, the information handling system may connect to the EFI system partition also referred herein as a local store or a cloud-based store for the recovery image. However, the recovery image restores the information to factory default settings as pre-boot and boot data such as firmware images, BIOS/firmware data, configuration variables, etc. specific to a particular platform are generally not backed up. As such, platform-specific pre-boot and boot settings are lost.

In addition, there may be several scenarios in which connecting to the local store or cloud-based store may not be feasible. For example, the data or the storage device that hosts the local store may be corrupted such that data recovery from the local store may not be possible as formatting or replacing the storage device will wipe the recovery image. In another scenario, the information handling system may not be able to connect to the cloud-based store during the boot failure because of a missing network connection, bad memory, data corruption, etc. In yet another scenario, one of NV-RAM, complementary metal-oxide semiconductor (CMOS), or SPI flash memory device which stores boot variables may be corrupted. Because boot variables stored in the NV-RAM, CMOS, or SPI flash memory device are generally not replicated in the local store or the cloud-based store, the corruption of one or more of the NV-RAM, CMOS, or SPI flash memory device impairs the ability of the information handling system to boot successfully even with access to a recovery image.

Because the current disclosure leverages a secure distributed firmware storage domain wherein platform-specific data such as firmware, software, boot variables, etc. are replicated and/or synchronized to include the latest versions, the current disclosure enables a reliable, safe, and secure way to recover or rollback the information handling system during a boot failure or when a hardware and/or software issue is detected.

Figure 2:
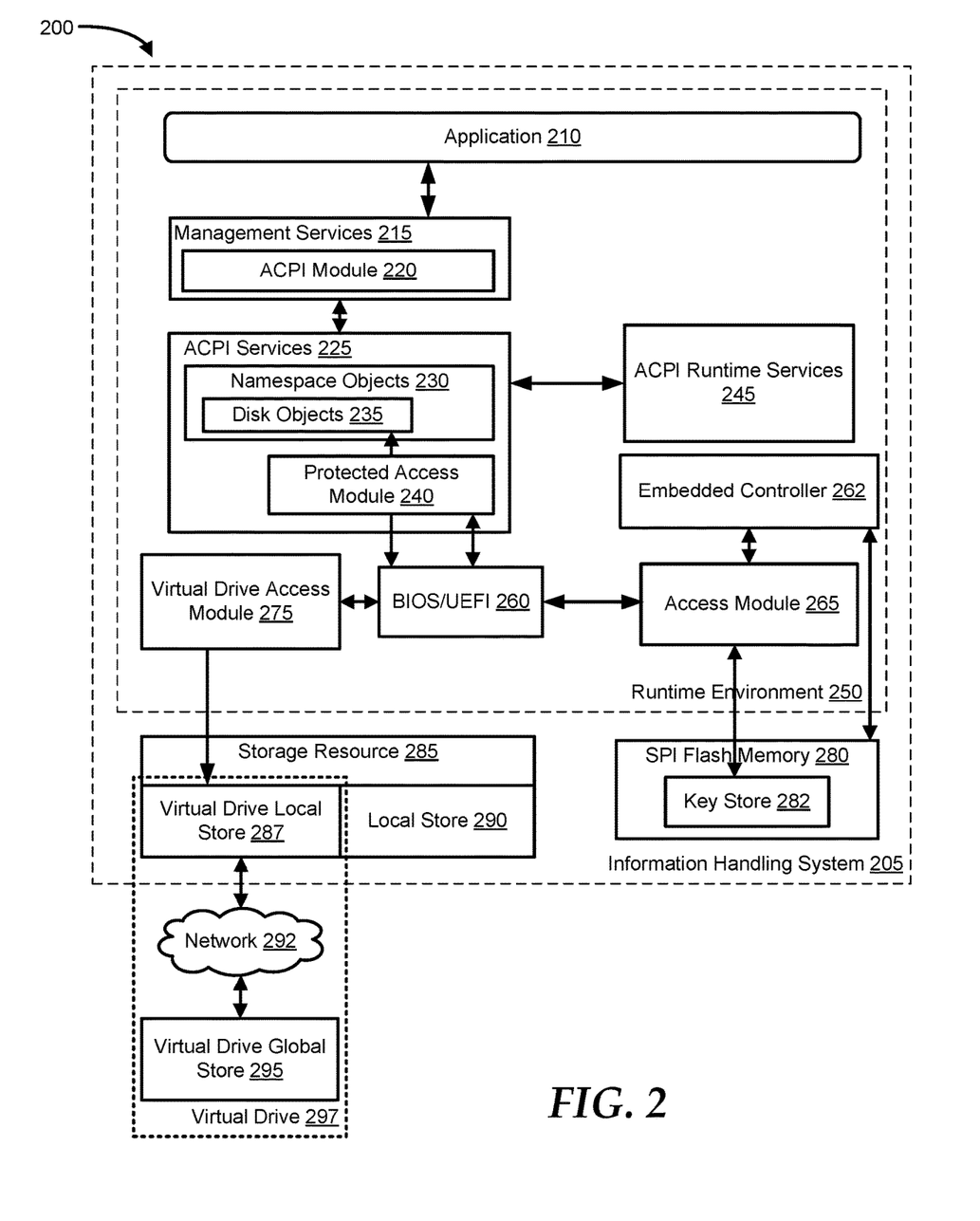
FIG. 2 is a block diagram illustrating an example of a system for secure access to a distributed virtual firmware network drive, according to an embodiment of the present disclosure.

FIG. 2 illustrates a system 200 for secure runtime access of platform-specific data stored in a virtual firmware network drive also referred to as a virtual network drive or simply virtual drive. System 200 includes an information handling system 205 and a virtual drive 297. Virtual drive 297 is a distributed virtual drive which includes a virtual drive local store 287 and a virtual drive virtual drive virtual drive global store 295. Virtual drive local store 287 which may be an EFI system partition is communicatively coupled with virtual drive global store 295 by a network 292. Information handling system 205 includes a storage resource 285, an SPI flash memory 280, and a runtime environment 250. Storage resource 285 includes local store 287 and a local store 290. SPI flash memory 280 includes a key store 282. Runtime environment 250 may include a runtime stack of BIOS/UEFI 260 services that may remain accessible while the operating system is executing such as date, time, non-volatile RAM access, etc. Runtime environment 250 includes an application 210, a management services 215, an Advanced Configuration and Power Management Interface (ACPI) services 225, an ACPI runtime services 245, a BIOS/UEFI 260, an EC 262, an access module 265, and a virtual drive access module 275. Management services 215 includes an ACPI module 220. ACPI services 225 includes a protected access module 240 and a namespace objects 230 which includes a disk objects 235.

Application 210 may include software applications and/or scripts configured to issue an I/O command also referred to as an I/O request for accessing data in virtual drive 297, local store 287, and/or virtual drive global store 295 collectively referred herein as virtual drive 297. The data stored in virtual drive 297 may include platform-specific data for use in recovery or rollback of information handling system 205 such as firmware, operating system image, and software. Platform-specific data may also include security information, authentication information, boot variables, network profiles, network configuration settings, etc. The platform-specific data stored in virtual drive 297 may also referred to as recovery data. Application 210 may issue the I/O request to retrieve, add, delete, and/or update the recovery data stored in virtual drive 297 at runtime using a variety of interfaces or operating system methods. The I/O request may pass through management services 215 which may include various technologies such as Windows® management instrumentation (WMI) core for accessing management information including the recovery data. Management services 215 may include ACPI module 220 which may be configured to interface with ACPI services 225. For example, ACPI module 220 may include WMI ACPI system modules which are WMI modules that are associated with ACPI system modules for ACPI devices.

ACPI services 225 includes ACPI methods which may be used to query and configure ACPI devices. The ACPI devices include various low-level system devices such as batteries, thermal zones, and services that are defined in information handling system 205's ACPI namespace. The ACPI namespace is a hierarchal namespace that BIOS/UEFI 260 uses to reference objects such as namespace objects 230. Namespace objects 230 are dynamic and may exist for the duration of an ACPI method execution. As shown, namespace objects 230 includes disk objects 235 which include objects associated with storage devices and/or stores such as storage resource 285 and virtual drive 297 in particular.

ACPI services 225 also includes protected access module 240 which may include methods and/or objects to be used by virtual drive access module 275 to securely access virtual drive 297. For example, protected access module 240 may also include lock/unlock objects for the lock/unlock methods in access module 265. BIOS functions in BIOS/UEFI 260, which is similar to BIOS/UEFI 142, along with the lock/unlock methods via virtual drive access module 275 may be used to lock/unlock and securely access virtual drive 297. BIOS functions in BIOS/UEFI 260 along with the lock/unlock methods may also be used to retrieve lock/unlock keys from SPI flash memory 280 and/or key store 282. The lock/unlock keys may be one or more of a valid signature, a valid session identification, or a valid certificate to lock/unlock virtual drive 297. In one embodiment, the lock/unlock keys may be generated based on a UEFI key such as a platform key and a key exchange key. BIOS/UEFI 260 may also retrieve various information such as a globally unique identifier (GUID) associated with an object identifier, a method name or identifier associated with the GUID and/or object identifier, etc. The aforementioned retrieved information may be used to identify information handling system 205 and/or virtual drive access module 275. In addition, the aforementioned information may be used to generate a security object like the lock/unlock key, to be used by virtual drive access module 275 for verification and/or authentication, such as by key exchange, to securely access virtual drive 297.

After unlocking virtual drive 297, virtual drive access module 275 may access virtual drive 297 and perform the I/O request. Virtual drive access module 275 with BIOS/UEFI 260 and/or ACPI services 225 may also verify that the issuer of the I/O request such as application 210 is authorized to perform the I/O request prior to the verification and/or authentication. The I/O request may be performed via the BIOS runtime services and/or ACPI runtime services. After performing the I/O request, virtual drive access module may lock virtual drive 297.

A signature also referred to as a token may be generated based on a public/private key, the UEFI key, or and a hash of the object's GUID, such as the GUID of the firmware, device, application, method or service. The signature may include an expiration time associated with the I/O request.

For example, the signature guarantees that the I/O request has not been altered in transit. EC 262 may be configured to understand the I/O request which may be transmitted as raw L2 packets over mailbox (Mbox) from BIOS/UEFI 260. In addition, EC 262 may be configured to determine if there is a communication channel between virtual drive access module 275 and virtual drive 297. If there is no communication channel, then EC 262 may be configured to initialize the network stack and establish the communication channel.

Virtual drive access module 275 may receive the I/O request as raw L2 packets over Mbox and transmit the I/O request as a Universal Network Driver Interface (UNDI) runtime service request. In particular, the I/O request may be transmitted as a UNDI command descriptor block (CDB) command. When the virtual drive access module 275 digitally signs the UNDI runtime service request, a one-way hash may be added using information handling system 205's platform key or a public/private key pair. Upon receipt of the UNDI runtime service request, virtual drive 297 may decrypt the UNDI runtime service request using a public key. Virtual drive 297 can then validate and/or authenticate that the UNDI runtime service request is from information handling system 205 and/or virtual drive access module 275 in particular. Virtual drive 297 and virtual drive access module 275 may utilize a key exchange mechanism for the validation and authentication process to protect virtual drive 297 from unauthorized access. The key exchange mechanism is performed to ensure that virtual drive 297 trusts information handling system 205 and vice versa. If the validation and/or authentication is not successful, then information handling system 205 is blocked for access by virtual drive 297.

ACPI services 225 may use runtime services or control methods in ACPI runtime services 245 to perform the I/O request. The control methods may be written in ACPI Source Language (ASL) that are compiled into ACPI Machine Language (AML) and loaded into ACPI namespace. ACPI services 225 may also use the methods/or object in protected access module 240 to retrieve keys in key store 282 and gain access to virtual drive 297 via virtual drive access module 275 similar to outlined above.

Local store 287, virtual drive global store 295, and virtual drive 297 may be associated with a hidden namespace identifier such as a GUID. The hidden namespace identifier is only known and can only be accessed by virtual drive access module 275. Using the hidden namespace identifier allows virtual drive local store 287, virtual drive global store 295, and virtual drive 297 to be hidden from the BIOS/UEFI 260, the operating system, and the methods associated with the operating system. In addition, access to virtual drive local store 287, virtual drive global store 295, and virtual drive 297 may be secured by a digital signature that associated with a firmware image or recovery material GUID. As such, access to virtual drive local store 287, global firmware store, and virtual drive 297 may require use one or more signatures and keys stored in key store 282. The signature may be generated based on a public key and hash of the firmware GUID. Thus, the backup and recovery firmware images and recovery material are protected from runtime and pre-boot level vulnerabilities.

BIOS/UEFI 260 includes functions to invoke device-specific operations, such as BIOS runtime services. For example, if a protected access method is called from WMI, the BIOS runtime services, in turn, may call the lock/unlock methods to check the access privilege and the key supplied by WMI. If the supplied key is valid, then virtual drive 297 can be unlocked. BIOS/UEFI 260 may also include other functions to invoke operations associated with the I/O request on virtual drive 297 through virtual drive access module 275. For example, BIOS/UEFI 260 can invoke a function to read or write data in virtual drive 297. To be able to read or write the data, BIOS/UEFI 260 may call a function in virtual drive access module 275 to provide secure access to virtual drive 297 and perform the read or write operation. Virtual drive access module 275 may return information associated with the read or write operation to BIOS/UEFI 260. For example, in a read operation, virtual drive access module 275 may return the data that was read. In another example, in a write operation, virtual drive access module 275 may return a status of the write operation, such as success or failure.

BIOS/UEFI 260 may also include functions to invoke operations associated with storing, updating, and/or retrieving keys such as public/private and platform keys, signatures, hashes, tokens, etc., collectively referred to herein as security objects, at key store 282 through access module 265. Access module 265 may be configured to provide secure access to SPI flash memory 280 and/or key store 282. In particular, access module 265 may include methods to lock and/or unlock SPI flash memory 280, key store 282 or a portion thereof. Access module 265 may detect whether SPI flash memory 280 or one of its regions is locked or unlocked. For example, a status register associated SPI flash memory 280 may be set to read-only when locked. If locked, access module 265 may unlock SPI flash memory 280, key store 282, or a portion thereof to prior to accessing the aforementioned to add, retrieve and/or update a security object which may be used to access virtual drive 297. Subsequent to the access of SPI flash memory 280, key store 282, or a portion thereof, access module 265 may lock SPI flash memory 280, key store 282, or the unlocked portion.

SPI flash memory 280 may be a non-volatile computer memory storage medium that is configured to store information used in booting up or in recovering information handling system 205 such as boot code, boot variables, configuration data, service tag, private/public key pair, the security objects, etc. SPI flash memory 280 may include security settings for granting read/write permissions for each region of SPI flash memory 280 such as key store 282, flash descriptor, platform data, management engine, etc. SPI flash memory 280 may be configured to be accessible by lock/unlock methods of access module 265 at runtime. Key store 282 may be configured as storage for the security objects such as signatures, tokens, and/or hashes, wherein each one of the aforementioned may be associated with a distinct object and/or GUID and wherein each object and/or GUID corresponds to a firmware, a device, a service, etc.

Virtual drive access module 275 may be configured to implement a host virtual network drive access (HVNDA) protocol which supports to secure the I/O request which includes an access request to virtual drive 297. Virtual drive access module 275 also includes an integrated local storage drive and network driver to provide access to virtual drive local store 287 as well as virtual drive local store 295 to execute the I/O request. The I/O request may be received from the operating system or one of the issuer of an operating system based method such as application 210, management services 215, ACPI services 225, ACPI runtime services 245, BIOS/UEFI 260, access module 265, etc. The I/O request may include an ACPI call to initiate access to virtual drive 297, wherein virtual drive access module 275 may use a UNDI runtime service to access and/or execute the I/O request. The UNDI runtime service may also be used to update the secure access to virtual drive 297, such as an update to a security object. The I/O request may be part of performing firmware backup and recovery operations at runtime, pre-boot, or during the boot process. Virtual drive access module 275 may also be configured to authenticate the access requests and create a secure session for communicating with the operating system or its component.

The firmware backup and recovery operations may be performed using the UNDI API. The various runtime and pre-boot methods such as the firmware backup and recovery operations may be implemented according to the HVNDA protocol such as during boot failure. In addition, the methods implemented to protect against vulnerabilities of operating system based methods such as WMI, ASL, system management mode (SMM), dynamically provisioned access control infrastructure (DACI), etc. to access virtual drive 297 at runtime may also adhere to the HVNDA protocol. For example, direct access of the aforementioned operating system based methods to virtual drive 297 is not allowed and is restricted to virtual drive access module 275. The HVNDA protocol may also be adhered to in performing various operations such as synchronization or update of the recovery data in virtual drive 297 at runtime, pre-boot or during the boot process.

Storage resource 285 or a portion thereof may be communicatively coupled to virtual drive access module 275. Storage resource 285 may include one or more storage devices such as an HDD or an SSD. Although only one storage resource 285 is depicted in FIG. 2, information handling system 205 may include or may be coupled to a plurality of storage resources. As shown, storage resource 285 may include a virtual drive local store 287 and a local store 290. Storage drivers associated with storage resource 285 may have access to local store 290 but not to virtual drive local store 287. In addition, local store 290 is not included in virtual drive 297 and is not accessible via network. Virtual drive local store 287 may be a partition of storage resource 285 that includes boot loader programs for installed operating system of information handling system 205, device driver files for devices in information handling system 205 that are used by firmware at boot time, system utility programs that are intended to be run before an operating system is boot, configuration data used at boot time, data files such as error logs, etc Network 292 may be a network and/or fabric configured to couple information handling system 205 to virtual drive global store 295 and/or other information handling systems. Network 292 may include a communication infrastructure which provides physical connections, and a management layer which organizes the physical connections and information handling systems communicatively coupled to network 292. Network 292 may be implemented as, or maybe part of, a storage area network (SAN), a personal area network (PAN), a local area network (LAN), a metropolitan area network (MAN), a wide area network (WAN), a wireless local area network (WLAN), a virtual private network, an intranet, the Internet, or any other appropriate architecture or system that facilitates the communication of signals, data and/or messages.

Network 292 may transmit data via wireless transmissions and/or wire-line transmissions using any storage and/or communication protocol including Fibre Channel, Frame Relay, Asynchronous Transfer Mode (ATM), Internet protocol (IP), other packet-based protocol, SCSI, Internet SCSI (iSCSI), Serial Attached SCSI (SAS), or any other transport that operates with the SCSI protocol, ATA, serial ATA (SATA), ATA packet interface (ATAPI), serial storage architecture (SSA), IDE, and/or any combination thereof. Network 292 and its various components may be implemented using hardware, software, or any combination thereof.

Virtual drive 297 may be a distributed virtual drive that includes virtual drive local store 287 and a cloud-based store, virtual drive global store 295 for the storage of recovery data. Virtual drive local store 287 may be accessible pre-boot, at boot-time and at runtime. Virtual drive local store 287 may be accessible at runtime by the operating system based methods via virtual drive access module 275 such that the operating system can store certain utilities, tools, and/or data files. In addition, virtual drive local store 287 may also be accessible at runtime for update of information stored therein such as the configuration data, device driver files, system utility programs, data files, etc. In an embodiment, in which information handling system 205 adheres to UEFI, virtual drive local store 287 may include an EFI system partition. Local store 290 may be a partition in storage resource 285 that is other than virtual drive local store 287. Although storage resource 285 is depicted to include virtual drive local store 287 and local store 290, storage resource 285 may include additional stores and/or partitions from additional local and/or network storage resources.

Virtual drive global store 395, which is similar to virtual drive local store 287, maybe a partition in a cloud-based storage resource. The size of virtual drive global store 395 may also be configured by an administrator during setup. By default, virtual drive global store 395 may be set to 1 GB. If not configured, virtual drive global store 295 may be set to a particular size by default. Each partition in the cloud-based storage resource may be associated with a platform. As such, virtual drive global store 395 may be mapped or associated with information handling system 205. In another embodiment, virtual drive global store 295 may be associated with virtual drive 297 which may then be associated with information handling system 205.

Figure 3:
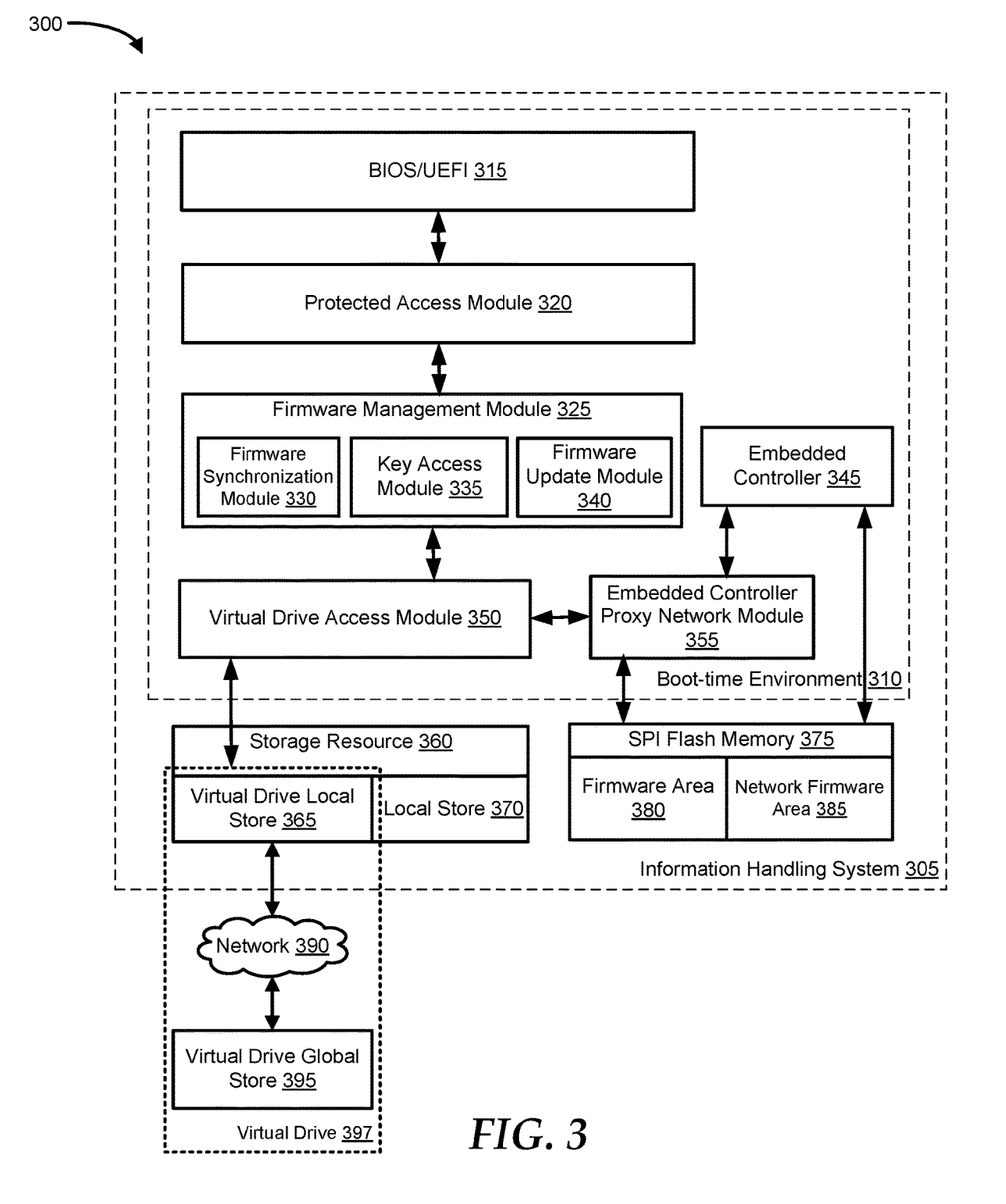
FIG. 3 is a block diagram illustrating an example of a system for secure access to a distributed virtual firmware network drive, according to an embodiment of the present disclosure.

FIG. 3 illustrates a system 300 for a secure boot time access to platform-specific data stored in a virtual drive. System 300 includes an information handling system 305 and a virtual drive 397 which includes a virtual drive local store 365 and a virtual drive global store 395. Virtual drive local store 365 and virtual drive global store 395 may be communicatively coupled by a network 390. Information handling system 305 is similar to information handling system 205. Virtual drive 397 is similar to virtual drive 297 while virtual drive local store 365 is similar to virtual drive local store 287 and virtual drive global store 395 is similar to virtual drive global store 295. In addition, local store 370 is similar to local store 290 while network 390 is similar to network 292. Information handling system 305 includes a boot-time environment 310, a storage resource 360, and an SPI flash memory 375. Boot-time environment 310 includes a BIOS/UEFI 315, a protected access module 320, a firmware management module 325, an EC 345, a virtual drive access module 350, and an EC proxy network module 355. One of skill may appreciate that information handling system 205 may include a BMC instead of EC 345. Similarly, information handling system 205 may include a BMC proxy network module instead of EC proxy network module 355. BIOS/UEFI 315 is similar to BIOS/UEFI 260. Protected access module 320 is similar to protected access module 240. EC 345 is similar to BMC 190. Virtual drive access module 350 is similar to virtual drive access module 275. SPI flash memory 375 may be a flash memory device associated with EC 345 and is similar to SPI flash memory 280. SPI flash memory 375 includes firmware area 380 and network firmware area 385. Firmware management module 325 includes a firmware synchronization module 330, a key access module 335, and a firmware update module 340.

Firmware management module 325 may be configured to perform firmware updates and firmware synchronization between the virtual drive local store 365 and virtual drive global store 395. Firmware update module 340 may update the firmware at virtual drive global store 395 when a new firmware version is released at an update service or repository such as Windows Update, Dell Drivers & Downloads site, etc. In addition, firmware management module 325 may be configured perform firmware update initiated a user such as via an interface. After the update, the latest firmware images at virtual drive 397 applicable to information handling system 305 is mapped accordingly.

Firmware synchronization module 330 may be configured to synchronize recovery data, between virtual drive local store 365 and virtual drive global store 395. Firmware synchronization module 330 may also be configured to synchronize boot variables in the NV-RAM, the CMOS, and the SPI flash memory device to virtual drive local store 365 and/or virtual drive global store 395 during the boot process. The synchronization may be performed based on a default or a pre-defined configuration setting which may be set by an administrator. In one embodiment, the synchronization of the recovery data and/or the boot variables may be performed based on a triggering event at pre-boot or during the boot process, at runtime or at shutdown. For example, the synchronization process may be initiated by firmware synchronization module 330 once it determines that access to a network is available during the boot process. Firmware synchronization module 330 may be configured to detect the update to the firmware and synchronize the updated firmware between virtual drive global store 395 and virtual drive local store 365, wherein the firmware version in virtual drive global store 395 will be the same firmware version in virtual drive local store 365. Firmware synchronization module 330 may be configured to determine an ideal time to perform the synchronization. For example, firmware synchronization module 330 when information handling system 305 is idle or below a certain performance or utilization threshold for a certain length of time. The runtime ACPI network procedures utilize the HVNDA protocol to synchronize the recovery data.

In another embodiment, the configuration setting may be set to synchronize the recovery material at certain intervals, such as daily or weekly. In yet another embodiment, the triggering event may be an update that includes as an addition, deletion, and/or a change to the recovery data stored in either virtual drive local store 365 or virtual drive global store 395. The synchronization process may synchronize the recovery data from the store where the triggering event was detected to the other store. For example, if the update to the recovery data is detected at virtual drive global store 395, firmware synchronization module 330 may synchronize the recovery material from virtual drive global store 395 to virtual drive local store 365.

Key access module 335 may be configured to add, update and/or retrieve a security object that may be used by BIOS/UEFI 315, protected access module 320, firmware management module 325, EC 345, EC proxy network module 355, and virtual drive access module 350 in authenticating access to virtual drive 397 and/or SPI flash memory 375. For example, the security object may be used to establish trust between virtual drive access module 350 and virtual drive 397. The security object may also be used to establish trust between one or more components of information handling system 305 such as BIOS/UEFI 315, protected access module 320, EC 345, EC proxy network module 355 and SPI flash memory 375. The security object may be retrieved from a key store at SPI flash memory 375. The key store may be similar to key store 282 of FIG. 2. Key access module 335 may determine the security object based on a GUID, an object identifier, etc. associated with the method, the service and/or the device such as a storage resource 360 or virtual drive 297 or its partition. Key access module 335 may create a secure domain using the security object to perform a method, service, or access the device synchronize, update, recover, rollback, etc. a firmware, a recovery data and/or information handling system 305. Key access module 335 may create the secure domain with virtual drive access module 350, EC proxy network module 355, and/or EC 345.

EC 345, which is similar to BMC 190 of FIG. 1, may be configured to initiate a recovery process information handling system 305 during an exception such as a boot failure. For example, EC 345 may re-initialize the network stack allowing virtual drive access module 350 to access and mount virtual drive 397 and continue the boot process and/or perform recovery of information handling system 305. EC proxy network module 355 includes functions and features to access SPI flash memory 375 during the exception as directed by EC 345. The functions and features may be implemented using UNDI, Simple Network Protocol (SNP), or Managed Network Protocol (MNP).

Network firmware area 385 may include proxy network profiles associated with information handling system 305. The network profiles include security and network settings. In addition, network firmware area 385 may include network drives, firmware, proxy network details, and/or configuration settings that may be used to initialize a network interface in the absence of operating system network drivers. For example, network firmware area 385 may include an UNDI driver. Network firmware area 385 may also include firmware to instantiate virtual drive access module 350. In addition, network firmware area 385 may also include recovery drivers which may be used during failover and/or recovery of information handling system 305.

Firmware area 380 may include firmware, drivers, software, etc. for booting information handling system 305. The firmware may include system BIOS, NIC firmware, USB firmware, etc. Each of the contents of firmware area 380 and network firmware area 385 may be associated with a GUID. On the other hand, each of the component of information handling system 305 and virtual drive 397, virtual drive local store 365, and/or virtual drive global store 395 may be associated with a corresponding object identifier. EC 345 and/or EC proxy network module 355 may retrieve the content of firmware area 380 and network firmware area 385 network profiles based on the object identifier and/or the GUID.

During the boot process, the recovery drivers may be loaded to EC 345 storage and/or the memory cache associated EC 345 from network firmware area 385. EC 345 may also synchronize network firmware area 385 with virtual drive 397 such that when the recovery driver is updated at network firmware area 385, an event is generated that triggers EC 345 to load the updated recovery driver to its storage and/or memory cache. If a failover happens, EC 345 pushes the recovery drivers to EC proxy network module 355. In addition, EC 345 may use EC proxy network module 355 to retrieve the proxy network profiles from network firmware area 385 and initialize the network interface which allows information handling system 305 to connect to network 390 and virtual drive 397. EC 345 may also use EC proxy network module 355 to retrieve and load firmware associated with virtual drive access module 350. After loading the firmware, EC proxy network module 355 may initialize virtual drive access module 350. EC 345 or EC proxy network module 355 may transmit the network profiles to virtual drive access module 350. EC 345 may also retrieve other data such as firmware, software, boot variables, etc. associated with information handling system 305 from firmware area 380.

Virtual drive access module 350 may be configured to mount and access virtual drive 397 using the network profiles and firmware received from EC 345 and/or EC proxy network module 355. Virtual drive access module 350 may also be configured to re-initialize a network stack based on the network profiles, firmware, and configuration settings. Once the network stack is re-initialized, virtual drive access module 350 can access the virtual drive global store 395. The virtual drive access module 350 can also access virtual drive local store 365. The boot process can then use the recovery data in virtual drive global store 395 and virtual drive local store 365 to successfully boot or recover information handling system 205.

Figure 4:
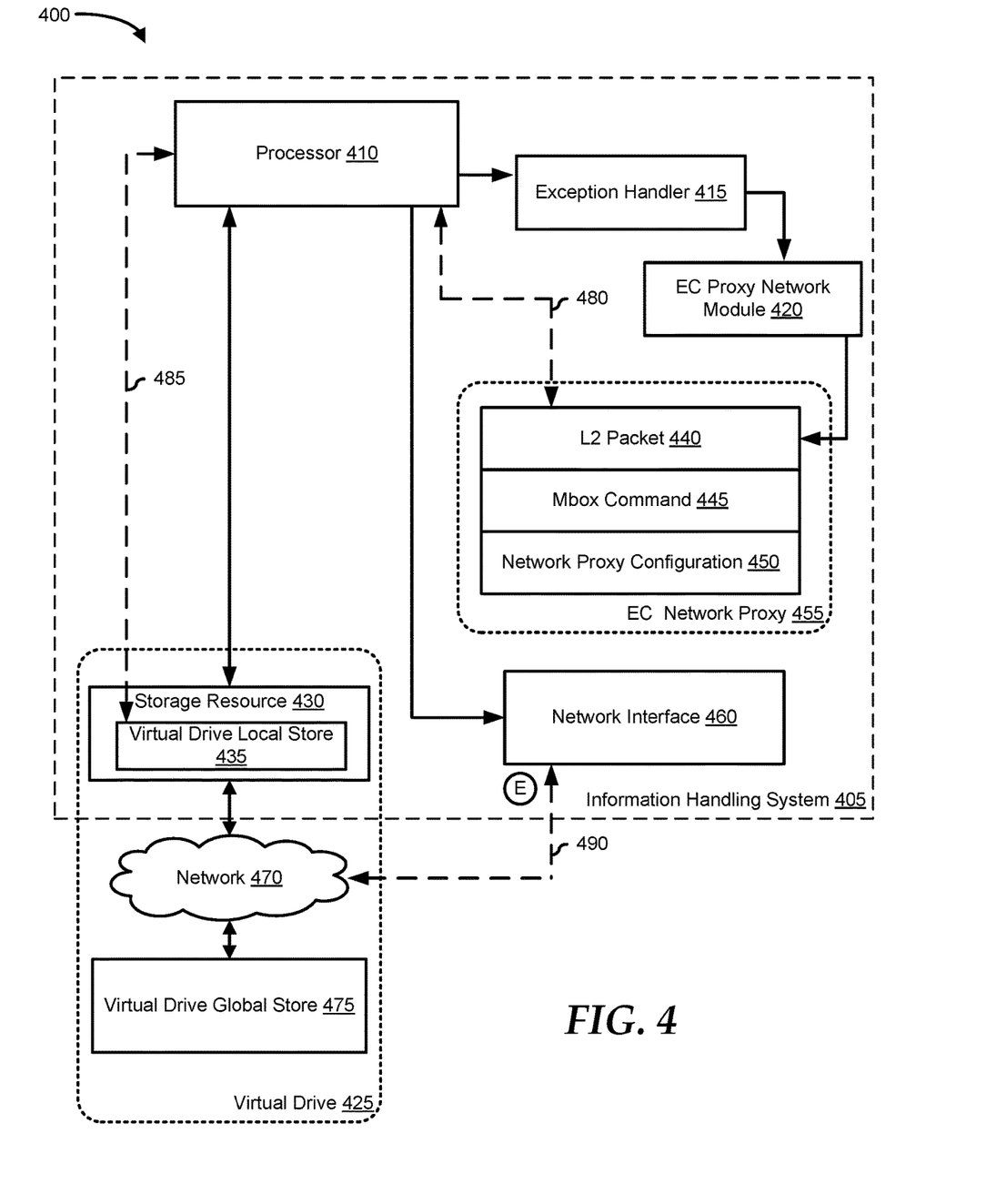
FIG. 4 is a block diagram illustrating an example of a system for secure access to a distributed virtual firmware network drive at boot failure, according to an embodiment of the present disclosure.

FIG. 4 illustrates a system 400 for mounting a virtual drive during a boot failure of an information handling system. System 400 is a more detailed illustration of re-initializing a host network stack utilizing network proxy profiles and configuration settings. This allows a UEFI system operation to potentially use the services of a UEFI runtime driver such as an UNDI driver to provide basic network connectivity in boot scenarios where the operating driver for the network interface controller is not available such as during a boot failure. The basic network connectivity allows mounting a remote network store associated with a virtual drive to continue the boot process or for recovery. System 400 may also include loading firmware associated with HVNDA protocol and initialize a virtual drive access module providing access to the virtual drive. System 400 includes information handling system 405, which is similar to information handling system 305 of FIG. 3, virtual drive 425 which is similar to virtual drive 397 of FIG. 3, and a network 470 which is similar to network 390 of FIG. 3. Information handling system 405 includes a processor 410, an exception handler 415, an EC proxy network module 420, an EC network proxy 455, a virtual drive local store 435 and a network interface 460. One of skill in the art will appreciate, that information handling system 405 may have a BMC proxy network module instead of EC proxy network module 420 and BMC network proxy instead of EC network proxy 455.

When a failure occurs, such as a boot failure, processor 410 may trigger hardware or software exception. Exception handler 415 may be configured to direct the operation of information handling system 405 in the event of the exception. The exception may be associated with a particular argument that directs exception handler 415 as to how to proceed in handling the exception, such as to start a failover and/or recovery process if recovery is possible or to halt processing of the information handling system 405 if recovery is not possible. In a particular embodiment, exception handler 415 may be configured to direct EC proxy network module 420 to initialize EC network proxy 455, which includes sending an L2 packet 440 to processor 410. L2 packet 440 includes instructions to initialize the Mbox interface.

Once the Mbox interface is initialized, a communication channel 480 is established which is used by processor 410 to send an Mbox command 445 to retrieve network proxy configuration 450. Network proxy configuration 450 may be used by processor 410 to initialize network interface 460 and establish a communication channel 490. Processor 410 may also establish a communication channel 485. Communication channel 490 allows processor 410 to talk to virtual drive global store 475 via network 470. Processor 410 may also leverage EC network proxy 455 to establish a communication channel 485 and communicate with virtual drive local store 435 included in storage resource 430. EC network proxy 455 may also include recovery drivers which may be used at the failover and/or the recovery.

Network interface 460 which similar to network interface 180 of FIG. 1 may include any suitable system, apparatus, or device operable to serve as an interface between information handling system 405, network 470, other information handling systems or network. Network interface 460 may enable information handling system 405 to communicate using any suitable transmission protocol and/or standard such as Peripheral Component Interconnect Express (PCIe). As network interface 460 which includes a NIC provides connectivity to network 470 this enables access to virtual drive 425 or virtual drive global store 475.

The current disclosure increases the level of data protection and access control of the recovery data while increasing its availability during boot recovery or at runtime by leveraging a virtual drive that is distributed between a local store and a cloud-based store. The recovery data is synchronized between the local store and the cloud-based store which allows the recovery data in either store to include the latest information. Because the recovery is specific to the platform, the information handling system is not just restored to the default factory settings but to the latest platform settings by providing a "hot" standby for recovery data and/or recovery image. The current disclosure may be used to recover firmware, recovery data, and/or the information handling system. For example, if the boot process of the information handling system fails, the information handling system can recover the boot failure and continue with the boot process. In addition, the information handling system is restored to its last known good state by automatically connecting to the virtual firmware store.

I/O requests to access virtual drive 425 may be passed to a virtual network access module that controls access to the virtual drive via protected access module and secure access module. For example, a host virtual network access module may use a public/private key exchange mechanism to access virtual drive 425. The private key may be "owned" by a firmware of the BIOS/UEFI with the corresponding public key passed to virtual drive 425 by processor 410 or the virtual drive access module as a variable in the I/O request. Another private key may be "owned" by information handling system 410, processor 410, and/or the virtual drive access module with its corresponding public key passed as another variable in the I/O request as well.

Figure 5:
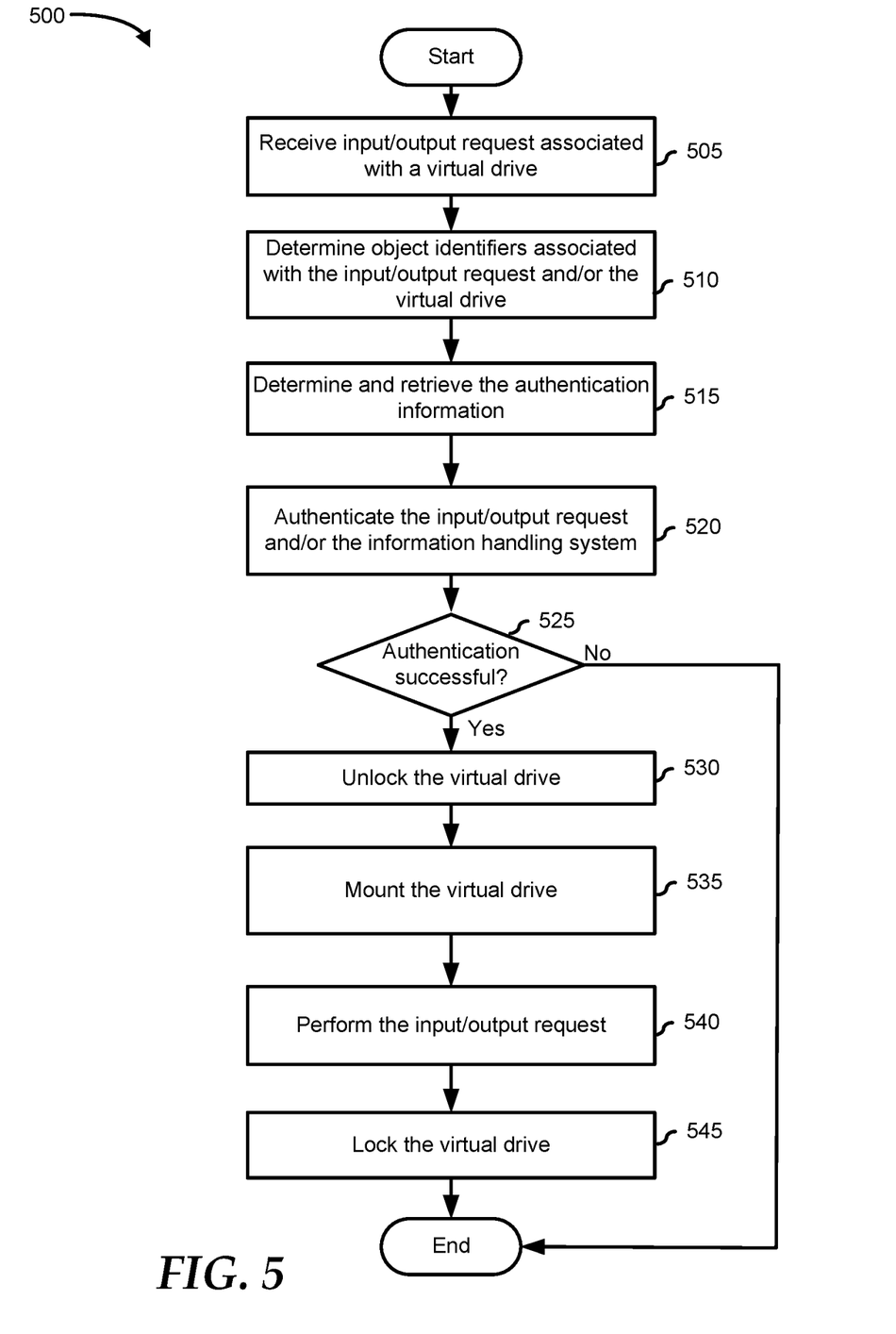
FIG. 5 is a flow chart illustrating an example of a method for secure access to a distributed virtual firmware network drive, according to an embodiment of the present disclosure.

FIG. 5 shows a method 500 for access to recovery data stored in the virtual drive at runtime. Method 500 may be performed by one or more components of FIG. 2. Method 500 typically starts at block 505 where the method receives and I/O request associated with a virtual drive. The I/O request may be issued by one of operating system based methods such as WMI, ASL, system management mode (SMM), dynamically provisioned access control infrastructure (DACI), etc. In addition to not having access to the virtual drive, the issuer of the I/O request does not know the existence nor how to access the virtual drive because the virtual drive namespace is hidden from the issuer of the I/O request.

The method proceeds to block 510, wherein the method determines object identifiers and/or GUIDs associated with the I/O request and one or more components of information handling system, and/or the virtual drive. For example, the method may determine the GUIDs of the partitions associated with the virtual drive. The method proceeds to block 515 where the method may also determine and retrieve authentication information which includes one or more security objects associated with the I/O request and/or the virtual drive. The security objects may be retrieved from non-volatile memory storage device such as a SPI flash memory device.

The method proceeds to block 520 where the method performs the validation and/or authentication process such as the key exchange mechanism with the virtual drive. The authentication process may be a mutual authentication between the virtual drive and the information handling system. The security object may be used to authenticate the I/O request, the virtual drive, the information handling system or a component thereof such virtual drive access module, the BIOS/UEFI, etc. A platform key may be used in the key exchange mechanism to determine if the information handling system is trusted and/or authorized by the virtual drive to perform the I/O request. The information handling system may use a public key to determine if it is communication with the correct virtual drive. The method proceeds to decision block 525 where the method determines if the authentication is successful. If the authentication is successful, then the "YES" branch is taken and the method proceeds to block 530. If the authentication is not successful, then the "NO" branch is taken and the method ends.

At block 530, the method unlocks the virtual drive. The method may use a particular security object to unlock the virtual drive. After unlocking the virtual drive, the method proceeds to block 535 where the method mounts the virtual drive which allows access to the virtual drive. The method proceeds to block 540 where the method executes the I/O request. After execution of the I/O request, the method proceeds to block 545 where the method locks the virtual drive. The method may transmit a result to the issuer of the I/O request. Afterwards, the method ends.

Figure 6:
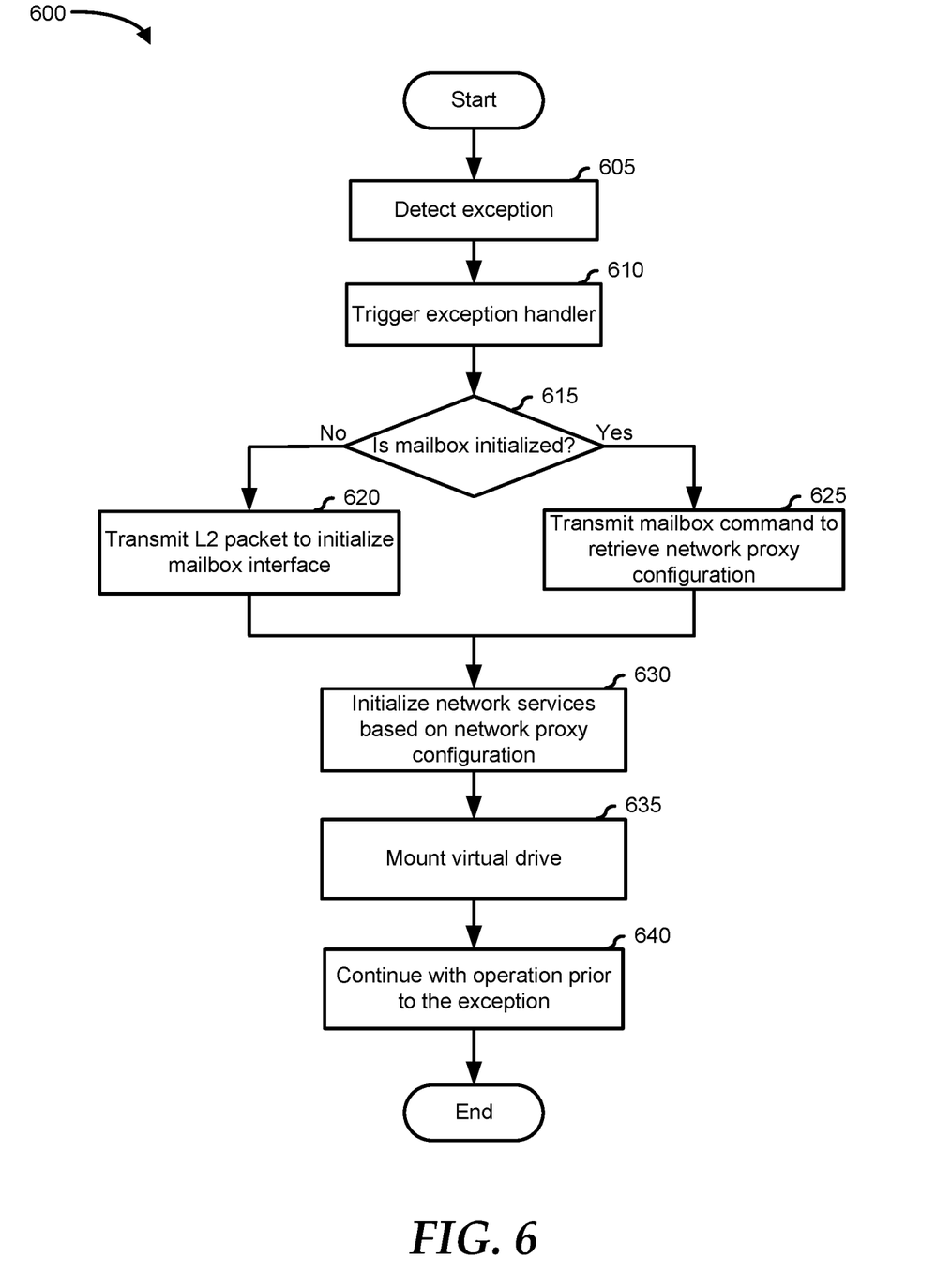
FIG. 6 is a flow chart illustrating an example of a method for secure access to a distributed virtual firmware network drive during an exception, according to an embodiment of the present disclosure.

FIG. 6 illustrates a method 600 for establishing connection to a virtual drive during an exception such as a boot failure. Method 600 may be performed by one or more components of FIG. 3 and FIG. 4. Method 600 re-initializes or initializes the network interface using the EC network proxy configuration settings. Once the network interface is initialized, method 600 connects to the virtual drive which provides a local drive access during failure scenarios. The method may utilize a pre-boot UNDI CDB which is in a raw network format to mount and secure communication to the remote storage device that hosts the virtual drive when the host network driver is not available such as during boot failure. The platform key may be used along with a firmware's GUID such as the GUID of the BIOS/UEFI to generate a digital signature that may be used to sign the UNDI request. The CDB included in each UNDI request provide services that allow the UNDI to access a network interface, network, and the remote storage device subsequent to a successful authentication. For example, the CDB may include a one byte operation code followed by command specific parameters such as the address of the remote storage device, a service action which contains a code value identifying a function to be performed at the virtual drive, and a length of the data to be transferred usually in number of blocks.

Method 600 typically starts at block 605 where a software or hardware failure also referred to as an exception is detected during the boot process. The method proceeds to block 610 where an exception handler is triggered by the exception. The exception handler is configured to load the EC proxy network module. The method proceeds to decision block 615 where the method determines whether the Mbox is initialized. If the Mbox is initialized, then the "YES" branch is taken and the method proceeds to block 625. If the Mbox is not initialized, then the "NO" branch is taken and the method proceeds to block 620. At block 620, the method that is the EC proxy network module transmits an L2 packet to the host processor. The L2 packet may include instructions for the host processor to retrieve the EC network proxy configuration and/or initialize the Mbox. After the Mbox is initialized, at block 625, the host processor transmits an Mbox command to retrieve the EC network proxy configuration details. The Mbox command is transmitted in raw L2 packet format. The EC network proxy details may be retrieved from a SPI flash associated with the EC. The EC network proxy details may include configurations of the information handling system and the virtual drive including username, password, and public keys.

The method proceeds to block 630 where the method, that is the EC, initializes the host network services using the retrieved EC network proxy configuration details. Once the host network service is initialized, the method, that is the host processor, at block 635 mounts the virtual drive. The host processor may mount the virtual drive as directed by the EC. In one embodiment, the EC may send raw L2 packets to the host processor to mount the virtual drive. The host processor may translate the L2 packets into a SCSI command and send the SCSI command to the remote storage device that hosts a remote drive associated with the virtual drive and treats the virtual drive as a locally attached storage. The host processor may also send SCSI commands to a local storage device that hosts the local drive associated with the virtual drive. The host processor may send the SCSI commands in UNDI CDB format.

The method proceeds to block 640 where the information handling system recovers from the exception and the boot process continues from the virtual drive. Thus, the host can perform boot recovery even during a local storage corruption without a reboot or download of an operating system image. The mounted firmware drive has a filesystem like interface wherein the firmware modules. The filesystem like interface also supports a catalogue and Firmware Over-The-Air (FOTA). In another embodiment, if the remote drive cannot be mounted and the local drive is not corrupted, the boot process proceeds from the local drive.

Although FIG. 5, and FIG. 6 show example blocks of method 500 and method 600 in some implementation, method 500 and method 600 may include additional blocks, fewer blocks, different blocks, or differently arranged blocks than those depicted in FIG. 5 and FIG. 6. Additionally, or alternatively, two or more of the blocks of method 500 and method 600 may be performed in parallel. For example, block 530 and block 535 of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor of an information handling system, an input/output request from an operating system to access recovery data stored in a partition in a remote storage device, wherein the partition is included in a virtual drive mapped to the information handling system, and wherein the operating system does not have access rights to the virtual drive, wherein the recovery data in the partition of the remote storage device is synchronized with local storage of the virtual drive;
retrieving authentication information from a key store that keeps authentication information associated with the processor, wherein the authentication information includes a platform key that is used to generate a digital signature;
providing the authentication information with the digital signature to the virtual drive that includes information associated with the input/output request and the processor;
responsive to receiving a successful authentication response from the virtual drive, unlocking and mounting the virtual drive allowing access to the recovery data; and
executing the input/output request at the partition of the virtual drive.

2. The method of claim 1, wherein the virtual drive includes a local partition in a local storage device.

3. The method of claim 1, wherein the authentication information is associated with the input/output request.

4. The method of claim 1, wherein the input/output request is an advanced configuration and power interface request.

5. The method of claim 1, wherein the virtual drive is hidden from the operating system.

6. The method of claim 1, further comprising locking the partition of the remote storage device subsequent to the executing of the input/output request.

7. The method of claim 1, further comprising using a universal network driver interface to update the authentication information.

8. The method of claim 1, further comprising performing a key exchange between the information handling system and the virtual drive.

9. An information handling system, comprising:
a processor; and
a memory coupled to hardware processor, the memory storing instructions that when executed cause the processor to perform operations including:
receiving an input/output request from an operating system to access recovery data stored in a partition in a remote storage device, wherein the partition is included in a virtual drive mapped to the information handling system, and wherein the operating system does not have access rights to the virtual drive, wherein the recovery data in the partition of the remote storage device is synchronized with local storage of the virtual drive;
retrieving authentication information from a key store that keeps authentication information associated with the processor, wherein the authentication information includes a platform key that is used to generate a digital signature;
providing the authentication information with the digital signature to the virtual drive that includes information associated with the input/output request and the processor;
responsive to receiving a successful authentication response from the virtual drive, unlocking and mounting the virtual drive allowing access to the recovery data; and
executing the input/output request at the partition of the virtual drive.

10. The information handling system of claim 9, wherein the virtual drive includes a local partition in a local storage device.

11. The information handling system of claim 9, wherein the authentication information is associated with the input/output request.

12. The information handling system of claim 9, wherein the input/output request is an advanced configuration and power interface request.

13. The information handling system of claim 9, wherein the authentication information includes a platform key associated with the processor.

14. A non-transitory computer-readable medium to store instructions that are executable to perform operations comprising:

receiving an input/output request from an operating system to access recovery data stored in a partition in a remote storage device, wherein the partition is included in a virtual drive mapped to an information handling system, and wherein the operating system does not have access rights to the virtual drive, wherein the recovery data in the partition of the remote storage device is synchronized with local storage of the virtual drive;

retrieving authentication information from a key store that keeps authentication information associated with a processor, wherein the authentication information includes a platform key that is used to generate a digital signature;

providing the authentication information with the digital signature to the virtual drive that includes information associated with the input/output request and the processor;

responsive to receiving a successful authentication response from the virtual drive, unlocking and mounting the virtual drive allowing access to the recovery data; and executing the input/output request at the partition of the virtual drive.

15. The non-transitory computer-readable medium of claim 14, wherein the virtual drive is hidden from the operating system.

16. The non-transitory computer-readable medium of claim 14, the operations further comprising locking the partition of the remote storage device subsequent to the executing of the input/output request.

17. The non-transitory computer-readable medium of claim 14, the operations further comprising performing a key exchange between the information handling system and the virtual drive.

* * * * *